April 30, 1929.  C. F. ANDERSON ET AL  1,711,338
CLUTCH
Filed Feb. 8, 1926   2 Sheets-Sheet 1
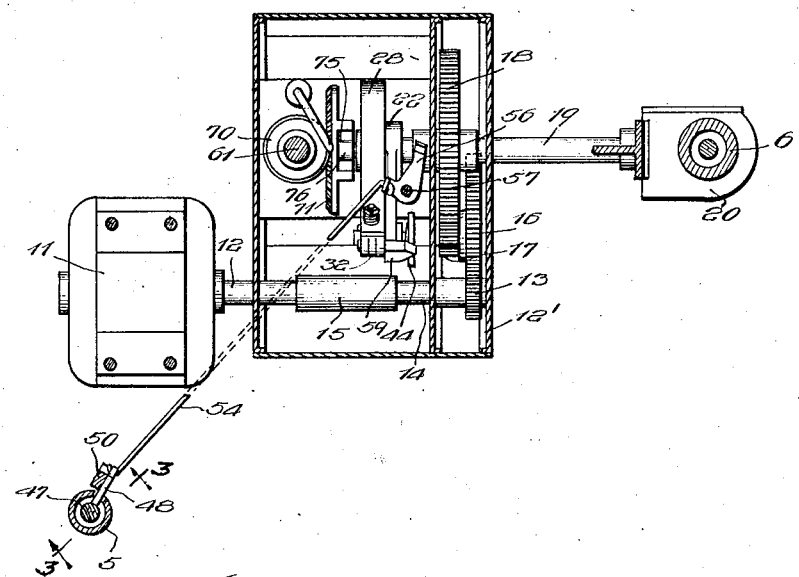
Inventors
Carl F. Anderson
Rudolph W. Janda

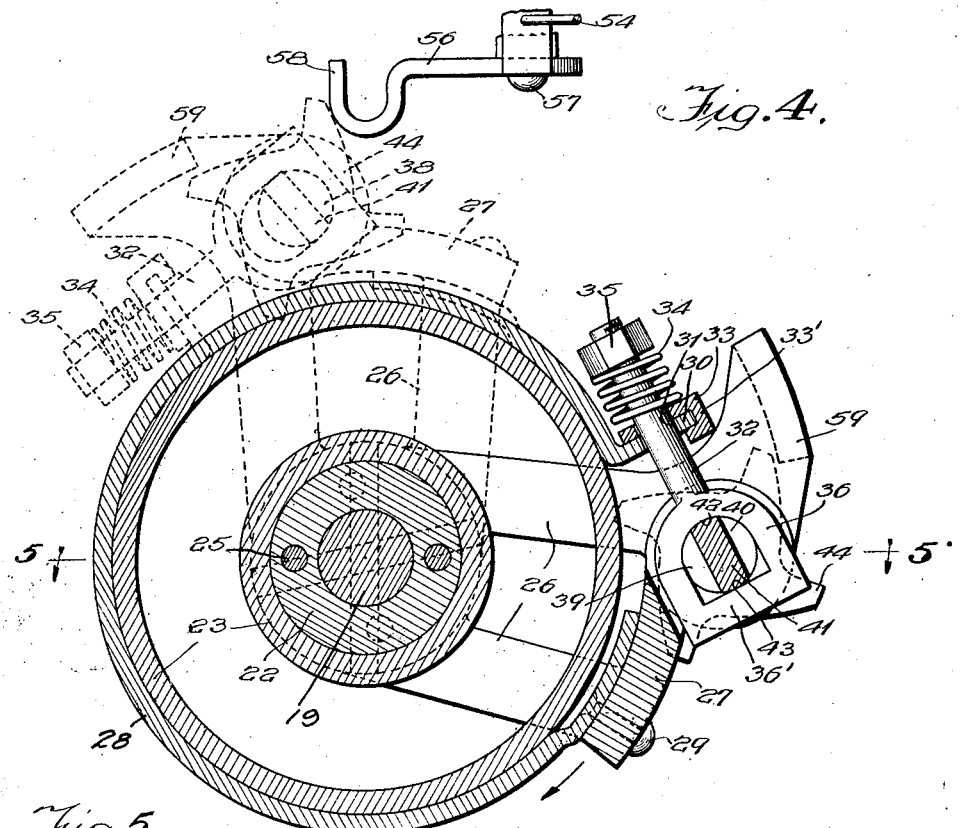

Patented Apr. 30, 1929.

1,711,338

UNITED STATES PATENT OFFICE.

CARL F. ANDERSON, OF BROOKFIELD, AND RUDOLPH W. JANDA, OF CICERO, ILLINOIS, ASSIGNORS TO CONLON CORPORATION, OF CICERO, ILLINOIS, A CORPORATION OF ILLINOIS.

CLUTCH.

Application filed February 8, 1926. Serial No. 86,701.

Our invention relates to clutches and it incorporates several features in the construction, operation and control.

One of the important features of the invention resides in the improved driving mechanism between a driving shaft and the parts driven thereby, the driving mechanism of our invention being designed to gradually and smoothly pick up and take on the load, this gradual and smooth clutching of the drive shaft to the parts driven thereby entirely eliminating sudden jerky and jarring movements.

Another important feature is to cause the gradual clutch mechanism to operate also as a governor to protect the apparatus against injury or breakage whenever the load becomes too great or any of the driven parts are suddenly retarded or checked. Our improved clutch mechanism under such conditions will yield or slip and will not fully clutch until the excess resistance or obstruction is removed.

Another important feature of our invention resides in the simple control of the clutching mechanism, the operation of a single push rod or button causing the continuously operating driving shaft to be either connected with or disconnected from driving connection with the driven members.

The above features and others are incorporated in the structure shown on the accompanying drawings in which drawings—

Figure 1 is a sectional view through the clutch housing and associated parts, looking down on the clutch;

Figure 2 is an enlarged side elevational view of the clutch mechanism and the controlling mechanism therefor;

Figure 3 is an enlarged end view on plane 3—3, Figure 1;

Figure 4 is an elevational view partly in section on plane 4—4, Figure 5; and

Figure 5 is a sectional view on plane 5—5, Figure 4.

By way of example, we will describe our clutch as used with a washing machine.

The machine shown comprises a cylindrical sheet metal tank 1 reinforced by a lower band 4. The tank is mounted on tubular legs two of which 5, and 6 are shown.

The clutch and drive mechanism is accommodated within a housing 8 suspended from the bottom of the machine frame in any suitable manner. A driving motor 11 is suspended from the machine frame and its armature shaft 12 extends into the housing 8. Alongside of this housing is an auxiliary housing 12' for various transmission gears, the transmission pinion 13 within said auxiliary housing being mounted on a shaft 14 which extends into the housing 8 in register with the armature shaft to be coupled thereto by a coupling member 15. The pinion 13 meshes with the gear 16 which is journaled in the housing 12' concentric with the pinion 17 which meshes with the gear 18 within the housing 12' and this gear is secured on the shaft 19 extending into the housing 8 and at its other end terminating in a gear box 20 supported on the leg 6 of the machine in which gear box there are beveled gears (not shown) and from which a shaft extends upwardly for operating a wringer.

The inner end of the shaft 19 extends into and is secured to a hub 22, and on this hub is journaled the clutch disc or drum 23 which is held in place thereon by the end plate 24 secured to the hub by means of screws 25 (Figures 4 and 5). The hub has the radial arm 26 with the end section 27 deflected laterally to overhang the clutch disc 23. A clutch band 28 surrounds the clutch disc and is secured at one end to the extension 27 as by means of rivets 29. The other end 30 of the clutch band is deflected radially and has the hole 31 for receiving the bolt 32. A washer 33 is applied to the end 30 to stiffen it and the washer is locked against rotation by its end 33' which extends around the outer edge of the end 30. A compression spring 34 abuts against the washer and the nut 35 on the threaded outer end of the bolt. At its inner end the bolt terminates in a stirrup head 36 which extends into the slot 37 formed radially in the deflected end 27 of the arm 26. Extending through and journalled in the end 27 is the cam cylinder 38, this cylinder extending through the slot 37 at right angles thereto. The cam cylinder has the opposite radially extending slots or recesses 39 and 40 which register with the slot or pocket 37 and with the stirrup head 36 of the cam bolt 32. Cutting the slots in the cam cylinder will leave the cam section 41. The cam section 41 has the arcuate sides 42 and 43 concentric with the cam cylinder axis and which may be coincident with the circumferential surface of said cam cylinder, as shown in Figures 4 and 5.

The spring 34 is so adjusted by means of the nut 35 that when the cam section 41 is in alinement with the bolt 32 and one of its arcuate sides engages against the stirrup bar 36' of the bolt, the bolt will be pulled and the spring compressed to draw the ends of the clutch band 28 toward each other so that the band will exert friction or clutching engagement against the clutch disc 23. However, when the cam cylinder is rotated 90° and one or the other of the slots 39 and 40 is presented to the cam bar 36', the bolt will be released and the spring pressure will be removed from the clutch band 28 and the elasticity of the clutch band will cause it to release itself from frictional engagement with the clutch disc 23. As will presently be described, the clutch disc is connected with the mechanism for operating the washing device within the tank of the machine.

The hub structure together with the clutch band and controlling cam mechanism is continuously rotated by the motor and the rotation of the clutch disc 23 is controlled by the engagement of the clutch band therewith.

Efficient and conveniently controlled means is provided for controlling the setting of the cam mechanism for either clutching or unclutching engagement of the clutch band with the clutch disc. Secured to one end of the cam cylinder 38 is the star wheel 44 having four arms spaced 90° apart. Through the opposite end of the cam cylinder extends a pin 45 for engaging in latch notches 46 extending radially in the part 27 and spaced 90° apart, the pin being held in latching engagement in a notch by means of a spring 46' inserted between the part 27 and the star wheel, as clearly shown in Figure 5. The locations of the notches 46 are such that the cam cylinder will be latched against rotation whenever the stirrup bar 36' is in contact with either of the sides 42 and 43 of the cam section 41 or is within either one of the notches 39 and 40. Thus the clutch band will be locked either in clutching or unclutching position relative to the clutch disc 23, and as the star wheel is successively advanced 90° the clutch disc 23 will either be clutched or unclutched by the band 28.

The mechanism for controlling the rotation of the star wheel is best shown in Figures 1, 2, 3 and 4. Through the tubular leg 5 of the machine extends a push rod 47 which normally projects a distance above the top of the leg, so that it may be readily depressed. A bell crank lever 48 has its outer arm extending into the leg through the opening 49 and forms a rest for the push rod 47. This bell crank lever is pivoted on a bracket 50 extending from a fitting 51 secured to the leg 5 and which may be the fitting which secures this leg to the reinforcing band 4 of the machine tank. The inner arm of the bell crank lever extends upwardly adjacent to the tank bottom. When the bell crank lever is rotated in clockwise direction (Figure 3) the push rod will be raised to expose its upper end above the top of the leg 5, and when the rod is then pushed down, the lever will be rotated in the opposite direction to the dotted position shown. A latch spring 52 is secured to the tank and has the ridge 53 for locking the lever in either of its positions until its position is positively changed.

Extending from the inner arm of the bell crank lever is the rod 54 whose other end is connected to the radial arm 55 of the trip finger 56 which is pivoted by means of the shaft 57. The finger has the curved abutment end 58 which, in one position of the finger, is in the path of the points of the star wheel as such wheel is carried around with the clutch band mechanism in the direction of the arrow shown on Figure 4, and in another position of the finger this end will be removed from the path of the star wheel. In the arrangement shown, when the push rod 47 is depressed, the bell crank lever 48 will be rotated to exert pull on the rod 54 and to swing the finger 56 to carry its end into the path of the star wheel. The finger is removed from the path of the star wheel by means of a cam wing 59 extending from the radial arm 26 in position to follow the star wheel as the radial arm revolves with the clutch band controlling mechanism. In Figure 4 the full lines show the location of the star wheel and cam wing after a cooperation with the finger, and the dotted lines show the star wheel about to engage with the finger and the cooperation of the cam wing with the finger to swing the finger out of the path of the star wheel before the next arm of the wheel comes into the field of the finger end. When the finger is thus swung to inoperative position, the bell crank lever 48 will be rotated to restore the push rod to its upper position and such position will be maintained by virtue of the latch spring 53 engaging with the outer arm of the bell crank lever. In the arrangement shown the cam mechanism is set to cause the clutch band to engage the clutch disc and the finger 56 is held out of the path of the star wheel, and therefore, such clutching engagement will continue until the operator depresses the push rod 47 and this will result in swinging of the finger into operative position to be engaged by the star wheel as shown in dotted lines of Figure 4. The star wheel will then be rotated 90° which will permit the stirrup bar of the stirrup bolt to engage in one of the notches 39 or 40 and the clutch band will be released. Immediately after the star wheel has been rotated 90° to effect unclutching, the cam wing will engage with the finger and throw it to inoperative position and then the clutch disc 23 and washing machine apparatus connected therewith will remain at rest until the push rod is again depressed and the finger moved to cause another 90° advance of the star wheel.

Our improved clutch mechanism is adaptable for use in different types of machines, but for purposes of description is shown as applied to a washing machine of the dolly or agitator type, the dolly of which is operated by a shaft 61.

The lower end of shaft 61 extends into the housing 8 and there terminates in a mitre pinion 70. This pinion meshes with the segmental gear 71 at the upper end of a rock lever 72 which is pivoted at its lower end in the bottom of the housing 8. The rock lever extends up alongside of the clutch disc 23 and has the guideway or channel 75 for the crank pin 76 extending from the clutch disc 23 so that when the clutch disc revolves the lever 72 will be rocked and its gear segment 71 will, by engaging with the pinion 70, impart rotary oscillation to the dolly shaft 61.

Having described our invention, we claim as follows:—

1. In combination, a clutch drum, a clutch band surrounding said drum, a rotatable support to which said clutch band is secured to travel therewith, a link having yielding connection with one end of the clutch band, a cam member on said support having engagement with the other end of said link, said cam member in one position causing said link to draw the clutch band into clutching engagement with said drum and in another position permitting said link to release the clutch band from clutching engagement, and means controlling the operation of said cam member.

2. In combination, a clutch disc, a clutch band surrounding said disc, a rotatable support to which one end of said band is secured, a link yieldingly connected at one end to the other end of said band, a cam on said support connected to the other end of the link and adapted when moved to one position to cause said link to draw the band into clutching engagement with said disc and when moved to another position to release said link, said link being adjustable, and means controlling the movement of said cam.

3. In combination, a clutch disc, a support revolvable about the axis of said disc, a clutch band surrounding said disc and secured at one end to said revolvable support, a link having yieldable connection with the free end of said band, a rotatable cam on said support co-operating with the other end of said link, said cam when rotated to one position causing movement of said link in one direction and contraction of the clutch band into clutching engagement with said disc and when moved to another position releasing said link to permit expansion of said band, and means controlling the rotation of said cam.

4. In combination a clutch disc, a driving shaft, a driving arm connected with said shaft, a clutch band encircling said disc and connected at one end to said driving arm, an elastic link extending between said arm and the other end of said band, said link normally permitting release of said band from said disc, and cam mechanism carried by the arm and operable to contract said link to thereby cause clutching engagement of said band with said dics.

5. In combination a clutch disc, a clutch band surrounding said disc, a revolving member to which one end of said band is secured to travel therewith, a link having yielding connection with the other end of the band, a setting member cooperating with said link, said setting member being mounted on said revolving member and being adapted for fractional rotational advancement, means whereby said setting member when rotated will set the link for causing either driving engagement with, or release of said band from, said clutch disc, and means in the path of said setting member for causing one advancement thereof for each revolution of said revolving member.

6. In combination a clutch disc, a clutch band surrounding said disc, a revolving member to which one end of said band is secured to travel therewith, a link having yielding connection with the other end of the band, a setting member cooperating with said link, said setting member being mounted on said revolving member and being adapted for fractional rotational advancement, means whereby said setting member when rotated will set the link for causing either driving engagement with, or release of said band from, said clutch disc, and means in the path of said setting member for causing one advancement thereof for each revolution of said revolving member, and means for preventing advancement of said setting member whereby a set condition may continue.

7. In combination a clutch disc, a supporting frame adapted to revolve about the axis of said clutch disc, a clutch band secured at one end to said frame and surrounding said disc, a clutch link extending from said frame to the other end of said band and having spring abutment engagement with such end, a cam member on said frame having cam formations adapted to alternately set said link for clutching said band to the disc or for releasing it therefrom, and means cooperating with said cam during its bodily movement with said frame for moving it to either one of its operative positions whereby said clutch disc will be either connected in driving relation with said revolving frame or be disconnected therefrom.

8. In combination a clutch disc, a frame revolving about the axis of said disc, a clutch band secured at one end to said frame and surrounding said disc, a link connected between the free end of said band and said frame, a rotatable cam on said frame having cam formations for cooperating with said link to cause clutching engagement of said band with said disc or release therefrom, a star wheel on said cam, an abutment adapted to be interposed in the path of said wheel during bodily travel thereof with said frame and tending to cause a rotational advance of said wheel for each revolution of said frame, and means for removing said abutment after an abutting operation thereof whereby the set position of said wheel will be maintained.

9. In combination a clutch disc, a revolving frame, a clutch band secured at one end to said frame and encircling said disc, a link between the other end of said band and said frame, a rotatable setting member cooperating with said link to cause contraction or expansion of the band and thereby clutching of said band to said disc or release of the band from the disc, a star wheel on said setting member, an abutment, means for interposing the abutment in the path of said wheel to engage therewith and cause a rotation of advance thereof and of the setting member connected therewith, and means carried on said frame for removing the abutment from the path of said wheel after an advancement of said wheel by said abutment.

10. In combination a clutch disc, a frame revolving about the axis of said disc, a clutch band secured at one end to said frame and encircling said disc, a link extending between the other end of said band and said frame, setting mechanism for said link adapted to be fractionally advanced to alternately cause said link to clutch said band to said disc and to release it therefrom, an abutment, a push rod, a connection between said rod and abutment adapted upon depression of said rod to cause movement of said abutment into the path of said setting mechanism to abut therewith and cause a rotational advancement thereof, and a cam wing on said frame adapted to shift said abutment from the path of said setting mechanism after an actuation of said setting mechanism.

11. In combination a clutch disc, a frame revolvable about the axis of said disc, a clutch band secured at one end to said frame and encircling said disc, a link having a yielding connection at the other end of said band and at its inner end having a cam abutment, a rotatable cam member on said frame having cam formations spaced equally circumferentially, said cam member when rotated from one cam formation to the other causing said link to alternately shift to engage the clutch band with said disc and to release the link to permit unclutching of said band, a star wheel on said cam member, an abutment finger, a push rod, a connection between said push rod and said finger adapted upon depression of said rod to move said finger into the path of said star wheel whereby said star wheel and said cam member will be advanced to effect the setting of said link, and a wing on said frame adapted to engage with and remove said finger from the path of said wheel after said wheel is advanced.

12. In combination a clutch disc, a frame revolvable about the axis of said disc, a clutch band secured at one end to said frame and encircling said disc, a link having yieldable connection with the other end of said band and terminating at its inner end in a cam abutment, a cam rotatable on said frame and having cam formations uniformly spaced circumferentially whereby said link will be set either to draw said band into clutching engagement with said disc or to release said band therefrom, a star wheel on said cam, an abutment finger, a push rod, a connecting train below the lower end of said rod and said finger adapted upon depression of said rod to cause said finger to be shifted into the path of said star wheel to be abutted thereby and whereby said wheel will advance said cam to the next cam formation to cause corresponding setting of the link and clutch band, and a wing on said frame adapted to remove said finger from the path of said cam wheel after an advance of said wheel whereby the link setting will be maintained.

13. In combination, a drive member, a driven member, an arm secured on the drive member for rotation therewith, a clutch band extending about the driven member and having one end secured to the arm, a link yieldingly connected to the other end of the band, a cam connection between the link and the arm, an actuating member operatively connected to the cam element of said connection, and a trip member movable into and out of the path of travel of the actuating member.

14. In combination, a drive member, a driven member, an arm secured on the drive member for rotation therewith, a clutch band extending about the driven member and having one end secured to the arm, a link yieldingly connected to the other end of the band, a cam connection between the link and the arm, an actuating member operatively connected to the cam element of said connection, and a trip member movable into and out of the path of travel of the actuating member, the arm and the cam connection having co-operating means for yieldingly locking the cam element in adjustment.

In witness whereof, we hereunto subscribe our names this 2nd day of February, 1926.

CARL F. ANDERSON.
RUDOLPH W. JANDA.